(12) United States Patent
Truong (10) Patent No.: US 9,248,840 B2
(45) Date of Patent: Feb. 2, 2016

(54) GESTURE BASED INPUT SYSTEM IN A VEHICLE WITH HAPTIC FEEDBACK

(71) Applicant: Immersion Corporation, San Jose, CA (US)

(72) Inventor: Dat Truong, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/137,540

(22) Filed: Dec. 20, 2013

(65) Prior Publication Data
US 2015/0175172 A1    Jun. 25, 2015

(51) Int. Cl.
| | |
|---|---|
| B60W 50/08 | (2012.01) |
| B60W 50/10 | (2012.01) |
| G10L 25/48 | (2013.01) |
| B60W 50/16 | (2012.01) |
| G06F 3/01 | (2006.01) |
| G06F 3/16 | (2006.01) |

(52) U.S. Cl.
CPC ............... *B60W 50/10* (2013.01); *B60W 50/16* (2013.01); *G06F 3/016* (2013.01); *G06F 3/017* (2013.01); *G10L 25/48* (2013.01); *G06F 3/167* (2013.01)

(58) Field of Classification Search
USPC ............................................................ 701/36
See application file for complete search history.

(56) References Cited

U.S. PATENT DOCUMENTS

| | | | |
|---|---|---|---|
| 7,050,606 B2 | 5/2006 | Paul et al. | |
| 7,519,223 B2 * | 4/2009 | Dehlin et al. | 382/203 |
| 7,792,328 B2 | 9/2010 | Albertson et al. | |
| 2009/0267921 A1 | 10/2009 | Pryor | |
| 2009/0278915 A1 | 11/2009 | Kramer et al. | |
| 2012/0019373 A1 | 1/2012 | Kruse et al. | |
| 2012/0192121 A1 | 7/2012 | Bonnat | |
| 2013/0261871 A1 * | 10/2013 | Hobbs et al. | 701/28 |
| 2014/0218187 A1 * | 8/2014 | Chun et al. | 340/439 |

FOREIGN PATENT DOCUMENTS

| | | |
|---|---|---|
| EP | 2624238 A1 | 8/2013 |
| WO | 2006025891 A2 | 3/2006 |
| WO | 2009062677 A2 | 5/2009 |

OTHER PUBLICATIONS

Extended EP Search Report, EP Application No. 14197941.9. Dated Jun. 2, 2015.

* cited by examiner

*Primary Examiner* — Yonel Beaulieu
(74) *Attorney, Agent, or Firm* — Medler Ferro PLLC (57) ABSTRACT

A system for controlling vehicle systems includes a haptic actuator, a gesture detection device, a controller, and a plurality of vehicle systems. The gesture detection device captures movements of a vehicle driver or passenger and outputs data representing a gesture made by the vehicle driver or passenger. The controller is coupled to the gesture detection device and receives a signal from the gesture detection device indicative of the gesture. The controller is coupled to the haptic actuator, and selects a haptic effect based on the detected gesture and sends a signal to the haptic actuator to provide the selected haptic effect. The controller is also coupled to the vehicle systems, and based on the detected gesture, the controller sends a signal to one of the vehicle systems to perform a particular action. The particular action of the vehicle system is matched with the selected haptic effect.

23 Claims, 5 Drawing Sheets

GESTURE BASED INPUT SYSTEM IN A VEHICLE WITH HAPTIC FEEDBACK

FIELD OF THE INVENTION

The present invention relates generally to gesture based input system for a vehicle, and more particularly to a gesture based input system for controlling vehicle systems and including haptic feedback to provide haptic effects to the user to confirm the gesture based inputs.

BACKGROUND OF THE INVENTION

Vehicles continue to add technology to assist, entertain, and/or provide a comfortable environment for occupants of the vehicle. For example, and not by way of limitation, navigation system using global positioning systems (GPS), environmental or climate control systems (such as HVAC controls), radios, CD players, auxiliary device players, video screens, DVD players, telephone systems, and other similar systems are frequently incorporated into vehicles. Controls for these systems are provided in various forms, such as, but not limited to, knobs, buttons, dials, and touch screens. More and more of the control systems are being incorporated into touch screens. Using these controls may require the driver to take his or her eyes off the road, which is dangerous. This may be particularly problematic with the increasing use of touch screen devices using virtual buttons and sliders displayed on a screen as an alternative to physical inputs. Users may interface with such devices almost exclusively by touching and/or otherwise manipulating the virtual buttons, sliders, scrollers, and the like on the screen with one or more finger(s). Because there often is no physical or "feel" distinction between virtual buttons, slides, etc., a user cannot "feel" for the location of a virtual button as was possible with physical buttons or knobs, for example. Further, graphic displays on the screen provide visual feedback responsive to the manipulation which further tempts the driver to look at the screen instead of the road.

Recent developments have allowed for voice-controlled systems for some of the vehicle systems. However, voice-controlled systems disrupt passengers in the vehicle, especially in situations where the microphone for receiving the voice command does not accurately receive or understand the voice command. This results in repetition of the command, and often causes the user to shout the command, thereby disturbing other passengers in the vehicle. Further, ambient noise such as the vehicle's entertainment system and road noise may interfere with the microphone receiving the command.

There has been some recent development in gesture based interfaces wherein a computer system can react to gestures or hand motions of a user. However, gestures based interfaces in a vehicle may not alleviate the problem of driver distraction as drivers may tend to look at a display screen or other device to ensure that a gesture based command is properly interpreted by the system. Further, accidental activation of the systems needs to be avoided. Accordingly, it would be desirable to incorporate a gesture based input system into a vehicle and to provide feedback in a manner that a user such as the driver is not distracted from the primary task of driving the vehicle.

SUMMARY OF THE INVENTION

Embodiments hereof are directed to systems for controlling vehicle systems including a haptic actuator, a gesture detection device, a controller, and a plurality of vehicle systems. The gesture detection device captures movements of a vehicle driver or passenger and outputs data representing a gesture made by the vehicle driver or passenger. The controller is coupled to the gesture detection device and receives a signal from the gesture detection device indicative of the gesture. The controller is coupled to the haptic actuator, and selects a haptic effect based on the detected gesture and sends a signal to the haptic actuator to provide the selected haptic effect. The controller is also coupled to the vehicle systems, and based on the detected gesture, the controller sends a signal to one of the vehicle systems to perform a particular action. The particular action of the vehicle system is matched with the selected haptic effect.

Embodiments hereof are also directed to systems for controlling vehicle systems including a haptic actuator, a gesture detection device, an audio detection device, a controller, and a plurality of vehicle systems. The gesture detection device captures movements of a vehicle driver or passenger and outputs data representing a gesture made by the vehicle driver or passenger. The audio detection device detects voice commands from the vehicle driver or passenger and outputs data representing the voice command to the controller. The controller is coupled to the gesture detection device and the audio detection device and receives signals from the gesture detection device indicative of the gesture and signals from the audio detection device indicative of the voice command. The controller is coupled to the haptic actuator, and selects a haptic effect based on the detected gesture or detected voice command and sends a signal to the haptic actuator to provide the selected haptic effect. The controller is also coupled to the vehicle systems, and based on the detected gesture or detected voice command, the controller sends a signal to one of the vehicle systems to perform a particular action. The particular action of the vehicle system is matched with the selected haptic effect.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although descriptions of embodiments hereof are in the context of a gesture based input and haptic feedback system in a vehicle, the invention may also be used in any other applications where it is deemed useful. Furthermore, there is no intention to be bound by any expressed or implied theory presented in the preceding technical field, background, brief summary or the following detailed description.

Figure 1:
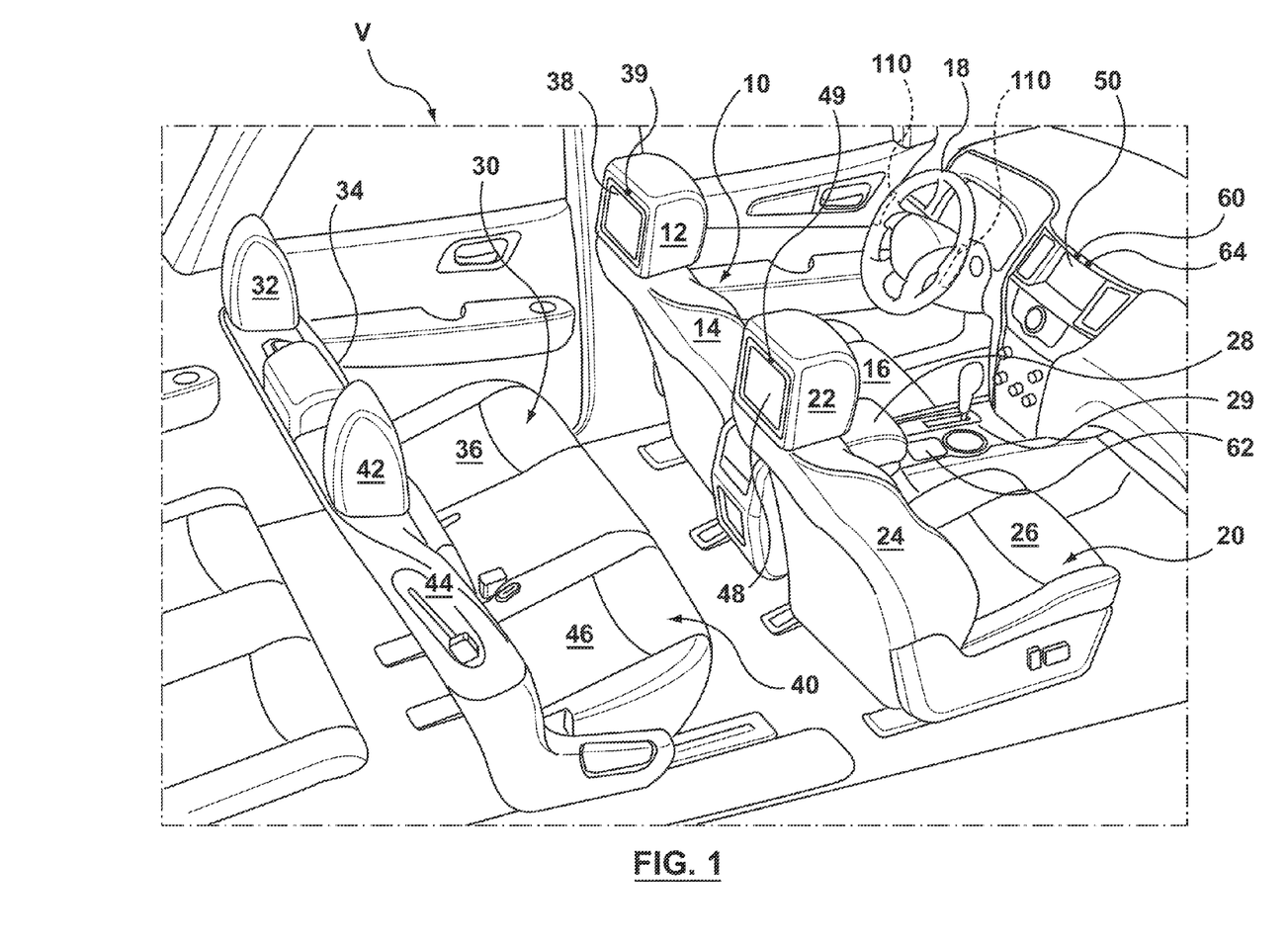
FIG. 1 is a schematic illustration of a vehicle with various systems illustrating an embodiment of a gesture based input system and haptic feedback system hereof.

FIG. 1 is a schematic illustration of an interior of a vehicle V. Several typical features of a vehicle interior will be described with respect to FIGS. 1-3. Vehicle V includes a driver seat 10 including a head rest 12, a back rest 14, and a seat base 16. A passenger side front seat 20 similarly includes a head rest 22, a back rest 24, and a seat base 26. A driver side rear seat 30 includes a head rest 32, a back rest 34, and a seat base 36, and a passenger side rear seat 40 includes a head rest 42, a back rest 44, and a seat base 46. Those skilled in the art would recognize that vehicle V can include more seats (as shown in FIG. 1) or fewer seats. Further, all seats do not need to include all the features described herein. For example, and not by way of limitation, head rests need not be provided. Vehicle V also includes a steering wheel 18, and an arm rest 28 disposed between driver seat 10 and passenger side front seat 20, as known in the art.

Vehicle V may also include an electronic control and display system 50 disposed in the front dash between driver seat 10 and passenger side front seat 20. Electronic control and display system 50 may be similar to a conventional control and display system such that it can be used to control and display functions of systems such as, but not limited to, a radio, a navigation system, a vehicle climate control system, blue-tooth systems, auxiliary systems such as DVD players, CD players and cellular phones, information systems, and other systems known to those skilled in the art. A driver side rear control and display system 38 may be attached to driver seat head rest 12 and face driver side rear seat 30. Similarly, a passenger side rear control and display system 48 may be attached to passenger side front seat head rest 22 and face passenger side rear seat 40. Control and display systems 38, 48 may include conventional control and display systems to control and display functions of systems such as, but not limited to, rear climate systems, rear entertainment systems such as DVD players and CD players, Bluetooth® wireless communication systems, and other systems known to those skilled in the art.

Control and display system 50 may include a camera or other gesture input detector 60 configured to detect movements of a driver and/or a passenger. Similarly, control and display systems 38, 48 may include cameras or other gesture input detectors 39, 49, respectively, to detect movements of passengers in rear seats 30, 40, as explained in more detail below. Although a camera 60, 39, 49, is shown associated with each control and display system 50, 38, 48, the present disclosure is not limited to such an embodiment. Instead, any manner in which the gestures of the driver and passengers may be detected and used as described in detail below may be used. For example, and not by way of limitation, several cameras located in the interior of vehicle V may track movements of the entire vehicle interior. Such a group of cameras can detect location, orientation, and movements of each of the passengers, including such details as movements of the passengers' hands and fingers. Cameras used in the present embodiment may be motion capture cameras used for optical detection. However, those skilled in the art would understand that other types of camera or detection systems may be used, such as, but not limited to, infra-red, RFID, and electromagnetic. As would be understood by those skilled in the art, systems such as those used for motion detection and processing in games such a XBOX Kinect™ or similar systems may be used.

Figure 2:
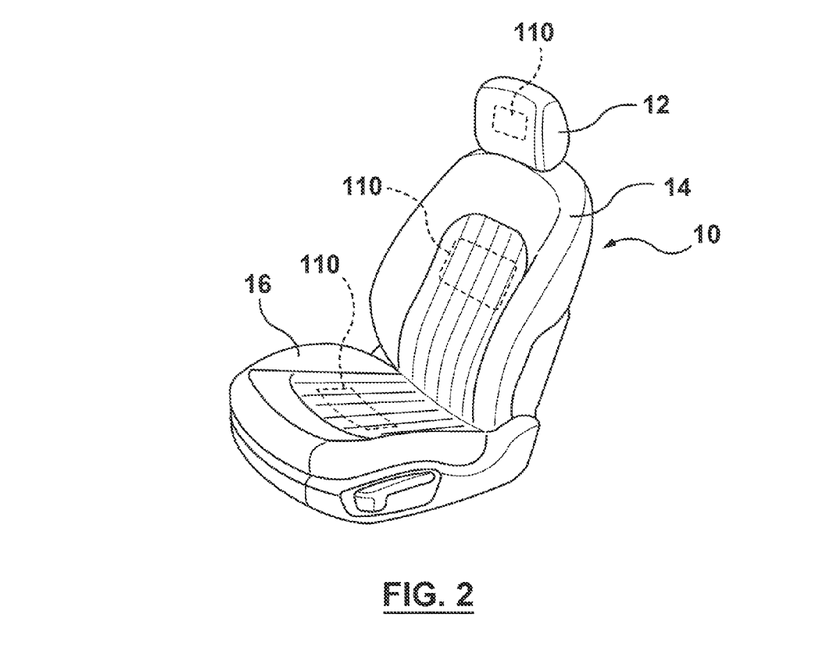
FIG. 2 is a schematic illustration of one of the seats of the vehicle of FIG. 1.

FIG. 2 shows further details of driver seat 10 of FIG. 1. In particular, driver seat 10 may include one or more haptic actuators 110 in portions of driver seat 10. In the embodiment shown in FIG. 2, haptic actuators 110 are incorporated into head rest 12, back rest 14, and seat base 16. However, as would be understood by those skill in the art, haptic actuators 110 may be incorporated in more or fewer locations in driver seat 10. Haptic actuators 110 are used in conjunction with a gesture based input system, as described in more detail below. Further, while FIG. 2 shows haptic actuators 110 incorporated into driver seat 10, haptic actuators may also be incorporated into passenger seat 20, driver side rear seat 30, and passenger side rear seat 40, and, more particularly, in their respect head rests, 22, 32, 42, back rests, 24, 34, 44, and seat bases 26, 36, 46.

Figure 3:
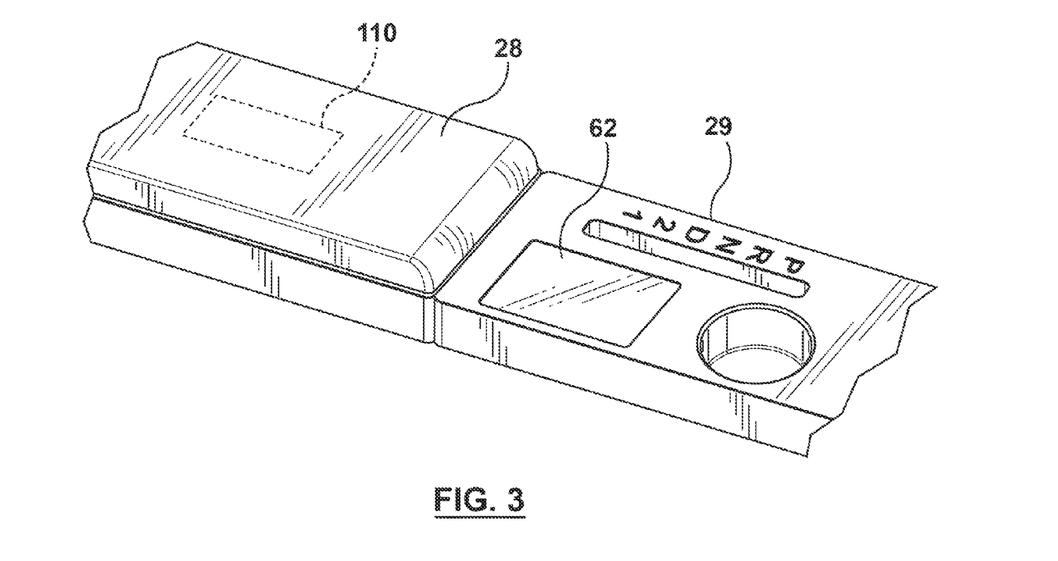
FIG. 3 is a schematic illustration of the center console and armrest between the driver seat and front passenger seat of the vehicle of FIG. 1

FIG. 3 shows a portion of arm rest 28 and center console 29 disposed between driver seat 10 and passenger seat 20. Arm rest 28 may include a haptic actuator 110 incorporated therein. Further, center console 29 may include a camera or other gesture input detector 62. In the situation where a gesture input detector 62 is used in center console 29, it may take the place of the camera 60. Further, camera or gesture input detector 62 may include a limited field of view such that user needs to perform the gestures in the vicinity of camera 62. Such a situation may be desirable such that inadvertent movements of a user are not detected as gestures to control the vehicle systems. Also, separating the camera or gesture input detector 62 from the display system 50 psychologically trains the user to separate the gestures from looking at the display. Thus, a driver is more likely to keep his or her eyes on the road instead of viewing display 50, which will also be aided by the haptic feedback system described in more detail below.

Haptic actuators 110 may be provided in other common contact surfaces of vehicle V. For example, and not by way of limitation, steering wheel 18 may include haptic actuators 110, as shown in FIG. 1. Further, other surfaces, such as door arm rests, arm rests between rear passenger seats, seat belts, and floors of the vehicle may include haptic actuators 110. Further, haptic actuators may be provided in objects or items that are wearable by the driver or passengers of vehicle V. For example, and not by way of limitation, haptic actuators 110 may be provided in gloves, hats, necklaces, wrist bands or wristlets, and other similar items that the driver or passenger may wear such that the haptic effect is felt directly by the driver or passenger.

In an embodiment, haptic actuators 110 may be vibrotactile devices that generate vibrations on the object in which actuator 110 is located, for example, within portions of seat 10, 20, 30, 40, on arm rest 28, steering wheel 18, or the wearable object, etc. Other types of haptic feedback may be provided. For example, and not by way of limitation, haptic actuators 110 may provide electrostatic friction or ultrasonic friction to the user. Other types of haptic feedback may be generated and provided to the user, including kinesthetic feedback (e.g., active and resistive force feedback), deformation, and/or other types of tactile feedback such as texture. As shown in FIGS. 1-3, multiple haptic actuators may be incorporated in different areas of vehicle V for providing haptic effects to different users or to signify different events, as explained in more detail below. Haptic actuators 110 may include electromagnetic motors, eccentric rotating mass ("ERM") actuators in which an eccentric mass is moved by a motor, linear resonant actuators ("LRAs") in which a mass attached to a spring is driven back and forth, shape memory alloys, electro-active polymers that deform in response to signals, mechanisms for changing stiffness, vibrotactile actuators, inertial actuators, piezoelectric actuators, moving magnet actuators, or other suitable types of actuating devices.

Figure 4:
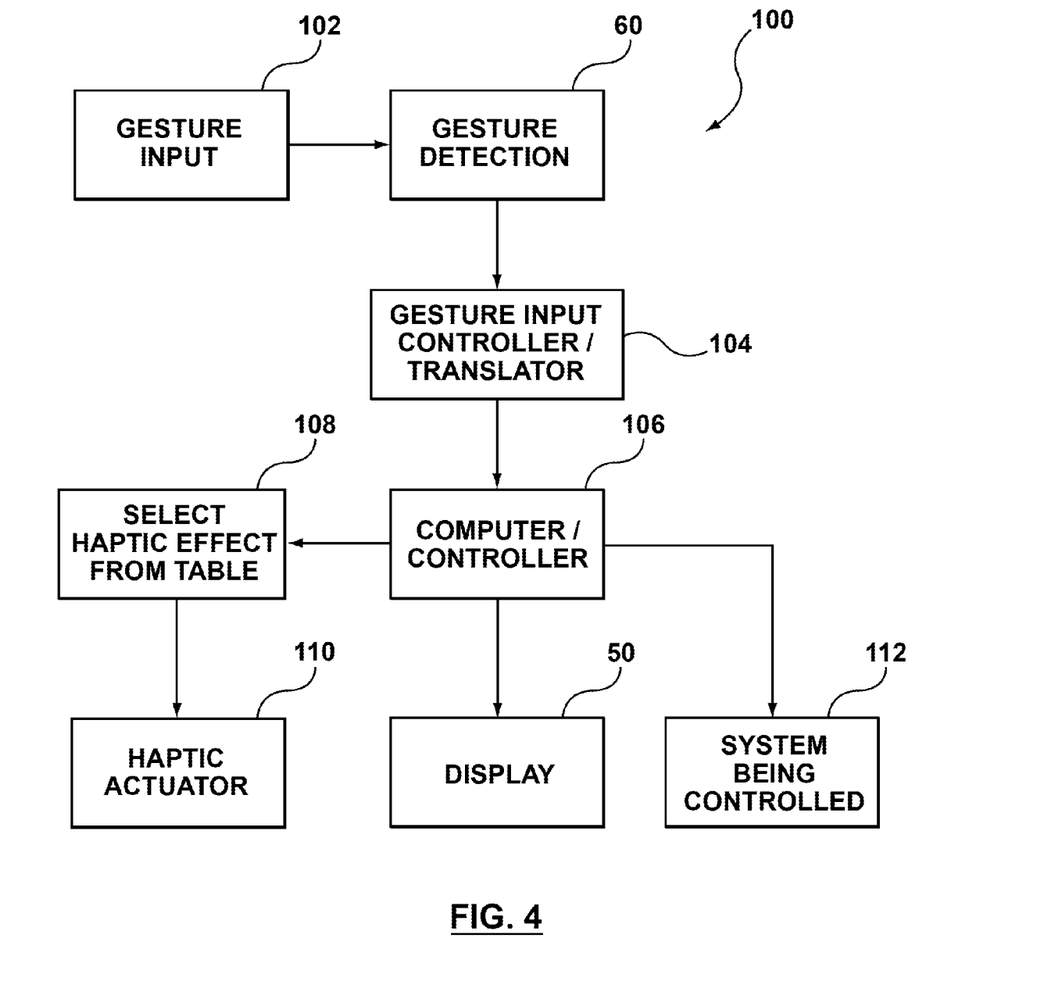
FIG. 4 is a block diagram of an embodiment of a gesture based input and haptic feedback system hereof.

FIG. 4 shows a block diagram of an embodiment of a gesture based input and haptic feedback system 100 and a flow chart for using the system 100. In particular, gesture input block 102 represents a gesture by a user of the vehicle, such as the driver. It is contemplated that such gestures are hand and/or finger gestures by the user. Other gestures may also be used. As the gesture is being made by the user, camera or other gesture detector 60 detects the gesture by the user. As explained above, gesture detector 60 may be a single camera, multiple cameras, or other devices configured to detect location, orientation, and movements of the user.

When the camera or gesture detector 60 detects a gesture, it sends a signal to a gesture input controller/translator 104. Gesture input controller/translator 104 converts the camera signal into a gesture signal and transmits the signal to a computer/controller 106. For example, and not by way of limitation, camera 60 may provide data in the form of location of the detected hands/fingers, speed/direction of motion, and other data regarding position, orientation, and movement of a users hands/fingers. Gesture input controller/translator 104 converts this data into a particular gesture from a table of potential gestures. For example, and not by way of limitation, possible gestures may include a hand wave in particular directions, finger movement left, right, up, or down, hand/finger rotation, finger pinch/unpinch, rapid waving, finger movement towards camera, and other gestures known to those skilled in the art. If desired, sophisticated gesture detection systems may detect individual fingers such that movement by the pointer finger may be distinguished by movement from movement by the pinkie finger, for example. However, the use of an interactive haptic feedback system, as described in more detail below, allows for a system which does not need to recognize or distinguish between minor variations in movements. Accordingly, a less costly gesture recognition system can be used in combination with the interactive haptic feedback system.

After the gesture input controller/translator 104 converts the data, the gesture signal is sent to a computer/controller 106. Those skilled in the art would recognize that gesture input controller/translator 104 may be combined with computer/controller 106. In the embodiment shown in FIG. 4, when computer/controller 106 receives a gesture signal, computer/controller 106 processes the data to provide signals to three different devices. In particular, computer/controller 106 matches the gesture signal to a haptic effect that is selected from a haptic table 108. For example, and not by way of limitation, if the haptic effect is generally a vibratory effect, a particular vibratory effect, in terms of degree, magnitude, frequency, and/or duration, is selected. Further, if the gesture based input system allows for input from multiple users, the computer/controller 106 selects to which user the haptic effect will be delivered. Further, in an embodiment, different haptic actuators 110 may be selected for an individual user. For example, and not by way of limitation, activation of a haptic actuator 110 in head rest 12 of driver seat 10 may have a different feedback meaning that activation of a haptic actuator 110 in seat base 16 of driver seat 10. In essence, the computer/controller 106 selects to which haptic actuator 110 a signal will be sent. Thus, computer/controller 106 selects a particular haptic effect from haptic table 108 and a particular haptic actuator 110 to which the effect will be applied. A signal for the selected haptic effect is then sent to the selected haptic actuator 110.

Figure 5:
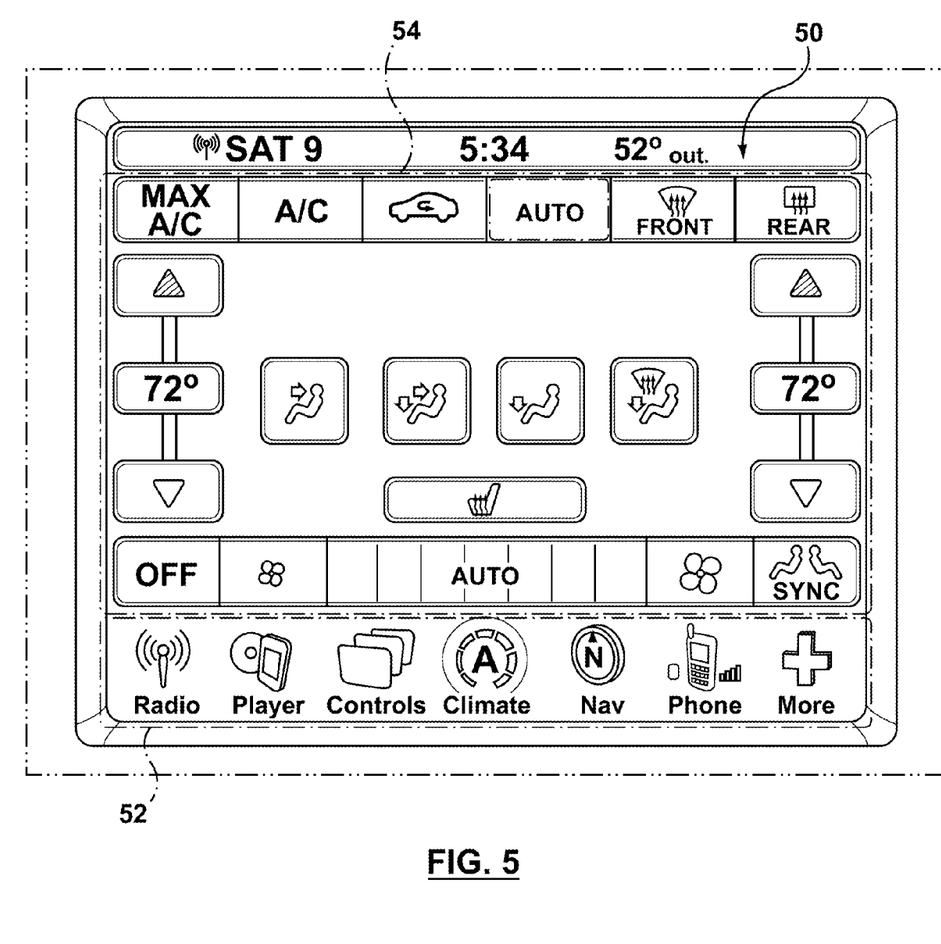
FIG. 5 is a schematic illustration of a display device of a vehicle.

Simultaneously, computer/controller 106 sends a signal to display 50 to show the action being taken. For example, and not by way of limitation, if a user selects an icon (e.g., radio, navigation, climate, etc.), computer/controller 106 sends a signal to display 50 for the selected icon to be highlighted. Further, any sub-menus associated with the selected icon will be displayed. For example, and not by way of limitation, FIG. 5 shows an example display with a main menu 52 and a sub menu 54. As described in more detail below, a gesture may be interpreted as selecting the climate control icon on main menu 52, as shown in FIG. 5. With such a selection, computer/controller 106 sends a signal to display to highlight the climate control icon, as shown in FIG. 5. With the climate control icon selected, the sub-menu 54 associate with the climate controls appears. Similarly, if any of the other icons on the main menu 52 are selected, a sub-menu associated with that main menu will appear.

Further, if the gesture by the user is used to control a particular system, computer/controller 106 also sends a signal to the vehicle system 112 to perform the selected control. For example, and not by way of limitation, upon selecting the climate icon of main menu 52, if a gesture to increase the driver side temperature is recognized by the camera 60 and processed as described above, computer/controller 106 sends a signal to the climate control system of the vehicle to increase the temperature air blown through the driver side vents, for example. In another example, if the radio icon is selected from main menu 52 and a particular gesture for increasing the volume is recognized, computer/controller 106 sends a signal to the radio control system 112 to increase the volume. Such signals will be sent to other vehicle control systems 112, such as for a CD player, navigation system, phone, DVD player, gaming system, or other vehicle system or sub-system, or auxiliary system coupled to a vehicle system. Further, those skilled in the art will recognize that although display 50 has been identified separately from other vehicle systems, display 50 is one of the vehicle systems and need not be identified separately. It is identified separately in this description for convenience because some actions result only in action on the display, such as highlighting an icon, whereas other actions result in action either only on the other vehicle systems, or in both the other vehicle systems and the display.

Accordingly, the haptic feedback described above can be used confirm or describe actions that are being taken based on the gesture based input. In one example, summarized in Table 1 below and described with respect to a system such as the system shown in FIG. 5, a driver of a vehicle V makes gestures that are monitored by camera 60. Although the example below is described with respect to a driver making gestures and particular haptic effects described below being felt by the driver, those skilled in the art will recognize that similar gestures may be made by passengers in the vehicle, that such gestures may be detected by camera 60 or other cameras, and that the haptic effect may be provided to the passenger making the gesture. Of course, those skilled in the art will also recognize that in some embodiments, only the driver of the vehicle senses haptic feedback, while the passengers may receive other types of feedback, such as audio or visual, because the passengers do not need to keep their eyes on the road. However, haptic effects may be desirable for passengers to enhance their experience when interacting with entertainment systems in the vehicle, such as gaming systems or video systems.

In the particular example discussed with respect to Table 1, the driver waves his or her hand/finger to wake up the system. Accordingly, computer/controller 106 sends a signal to select the haptic effect of a short vibration from table 108 and sends it to a haptic actuator 110 associated with the driver, such as in driver seat 10. Upon feeling the short vibration, the driver may begin moving a finger or hand to track across main menu 52. As the driver is moving a finger/hand, a light continuous vibration alerts the drive that a pointer on display 50 is moving across the screen. When the pointer reaches a selectable area on main menu 52, such as the climate icon, the intensity of the vibration is raised to be a medium continuous vibration.

The driver can select the icon by pinching his or her fingers. Computer/controller 106, upon recognizing the gesture, will send a signal to select multiple short vibrations from the haptic effect table 108 and send a signal for such vibrations to a haptic actuator 110 associated with the driver. Simultaneously, a signal is sent to display 50 to highlight the climate icon and to display the climate sub-menu options on sub-menu 54, as shown in FIG. 5. The haptic effect allows the user to know that the icon has been selected. In order to further avoid the need for the driver to look at display 50, when the driver activates the system, display 50 may always start at a certain icon. This allows the user to become accustomed to the order in which the icons are selected. For example, if display 50 always starts with the radio icon, the driver knows that when the driver has felt the fourth medium continuous vibration, the pointer is on the climate icon. Many other variations are possible for allowing the driver to recognize which particular icon is selected. For example, and not by way of limitation, each icon can be designated with its own haptic effect, such as by the particular effect or the location the effect is felt by the driver. For example and not by way of limitation, when the radio icon is selected, the haptic effect may be delivered via a haptic actuator 110 in the head rest 12 of driver seat 10, whereas when the climate icon is selected, the haptic effect may be delivered via a haptic actuator in the seat base 14 of driver seat 10. Of course, depending on the number of systems controlled, other variations would likely be necessary. For example, and not by way of limitation, each icon associated with sound may be associated with a haptic effect delivered to haptic actuator 110 in head rest 12, with each having its own haptic effect, such as one vibration for the radio, two for the CD player, and three for the phone. Similarly, selection of the climate icon may result in one vibration to the seat base 12, and selection of the navigation icon may result in two vibrations to the seat base 14. Similarly, if all haptic effects are delivered via a single haptic actuator, then variation in the haptic effect could be used to distinguish between the icons.

Once the icon has been selected from main menu 52 and the sub-menu 54 for the selected system has appeared, as described above, the driver may make further gestures to control the selected system as displayed on sub-menu 54.

Thus, in the example provided in FIG. 5 and Table 1, upon selection of the climate icon, the driver may move a finger to select items along the top bar of sub menu 54 in a similar fashion as described above with respect to main menu 52, and the appropriate haptic effect is provided. For example, and not by way of limitation, upon selection of "Auto" in the top bar of sub-menu 54, the driver may rotate his or her hand clockwise to increase the temperature and counter-clockwise to decrease the temperature, similar to a rotary dial or knob. When such a gesture is recognized by camera 60, computer/controller 106 sends a signal to select the haptic effect of a continuous vibration with increasing magnitude from haptic effect table 108 and the signal for such an effect is sent to a haptic actuator 110 associated with the driver, who feels the effect. Simultaneously, a signal is sent to display 50 to highlight the up arrow in the temperature slide and to increase the temperature setting displayed. Also, a signal is sent to the vehicle climate control system to set the temperature to the selected temperature.

TABLE 1

| GESTURE INPUT | SYSTEM ACTION | HAPTIC EFFECT EXAMPLE |
| --- | --- | --- |
| Waving hand/finger | Ready for input/wake up | Short vibration |
| Finger/hand tracking | Pointer present on screen | Light continuous vibration |
| Finger/hand tracking | Pointer on selectable area | Medium continuous vibration |
| Hand/finger movement from left to right | Next menu, track, or other option, accept, higher value | Short vibration |
| Hand/finger movement from right to left | Previous menu, track, option, or home, reject, lower value | Short vibration |
| Hand/finger movement downward | Scroll down, more menu, lower value | Short vibration on value change/scroll action |
| Hand/finger movement upward | Scroll up, more menu, higher value, top menu | Short vibration on value change/scroll action |
| Pinch fingers/close hand | Icon/menu selection, zoom change, advance menu, back, accept | Short vibration or multiple short vibrations |
| Open fingers/open hand | Icon/menu selection, zoom change, advance menu, back, accept | Short vibration or multiple short vibrations |
| Waving finger/hand (in menu) | Reject, back, home, clear | Continuous vibration |
| Finger/hand movement toward screen | Accept, select, next, zoom | Short or medium length vibration |
| Rotate hand clockwise/Move fingers in a clockwise arc | Change virtual dial value, rotate menu/screen/icon | Continuous vibration of increasing magnitude or vibration on change of value/location |
| Rotate hand counterclockwise/Move fingers in a counter clockwise arc | Change virtual dial value, rotate menu/screen/icon | Continuous vibration of decreasing magnitude or vibration on change of value/location |

Those skilled in the art would recognize that the description and Table 1 above provides only examples of the types of gestures and haptic effects that can be used. Similar hand gestures and haptic effects can be used to control the other vehicle systems. Further, different gestures and haptic effects may be used. The desired purpose of the gesture identification and haptic effect feedback system is to allow a simple method for the driver or passenger to control the vehicle systems without reaching towards or looking at a display that may distract the driver, and with sufficient haptic effect feedback such that the driver or passenger is comfortable that the desired action is taking place in response to the gesture command. Further, providing such haptic feedback can be used to enhance the experience of the driver and/or passenger(s).

Further, although the embodiment described above relates to a gesture based input system with haptic effect feedback, those skilled in the art would recognize that detecting advanced gestures may be costly. Accordingly, FIG. 6 and Table 2 below show an embodiment wherein gesture based input and audio input are combined, with haptic effect feedback used to confirm commands, as in the embodiment above. In particular, FIG. 6 shows a block diagram of an embodiment of a gesture and audio based input and feedback system 200 and a flow chart for using the system 200.

Figure 6:
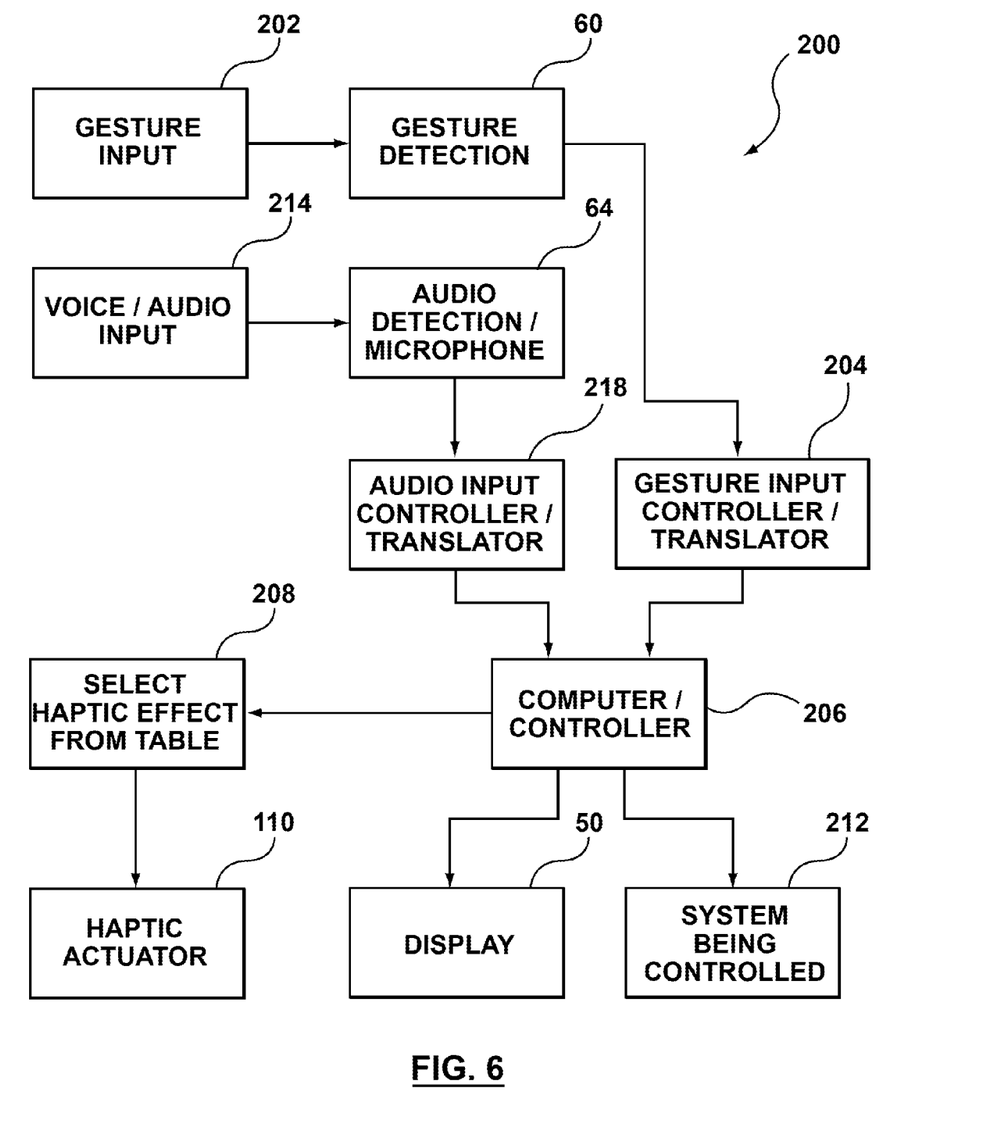
FIG. 6 is a block diagram of an embodiment of a gesture and audio based input and haptic feedback system hereof.

In FIG. 6, gesture input block 202 represents a gesture by a user of the vehicle, such as the driver. It is contemplated that such gestures are hand and/or finger gestures by the user. Other gestures may also be used. As the gesture is being made by the user, camera of other gesture detector 60 detects the gesture by the user. As explained above, gesture detector 60 may be a single camera, multiple cameras, or other devices configured to detect location, orientation, and movements of the user.

Similarly, voice/audio input block 214 represents a sound or voice command made by a user of the vehicle, such as the driver. It is contemplated that such voice commands will be simple voice commands, for example, the simple voice commands shown in Table 2 below. Other voice commands may also be used. An audio input detector or microphone 64 detects the audio/voice command. Microphone 64 may be located adjacent to camera 60, as shown in FIG. 1, or elsewhere in vehicle V, as known to those skilled in the art.

When the camera or gesture detector 60 detects a gesture, it sends a signal to a gesture input controller/translator 204. Gesture input controller/translator 204 converts the camera signal into a gesture signal and transmits the signal to a computer/controller 206. For example, and not by way of limitation, camera 60 may provide data in the form of location of the detected hand/finger, speed/direction of motion, and other data regarding position, orientation, and movement of a users hand/finger. Gesture input controller/translator 204 converts this data into a particular gesture from a table of potential gestures. For example, and not by way of limitation, possible gestures may include a hand wave in particular directions, finger movement left, right, up, or down, hand/finger rotation, finger pinch/unpinch, rapid waving, finger movement towards or away from the camera, and other gestures known to those skilled in the art. If desired, sophisticated gesture detection systems may detect individual fingers such that movement by the pointer finger may be distinguished by movement from movement by the pinkie finger, for example. However, the use of an interactive haptic feedback system, as described in more detail below, allows for a system which does not need to recognize or distinguish between minor variations in movements. Accordingly, a less costly gesture recognition system can be used in combination with the interactive haptic feedback system.

Similarly, when microphone 64 detects a sound, it sends a signal to an audio input controller/translator 218. Audio input controller/translator 218 converts the voice signal into a data signal representative of the voice command and transmits the signal to computer/controller 206.

After the gesture input controller/translator 204 and/or audio input controller/translator converts 218 the data, the signal is sent to a computer/controller 206. Those skilled in the art would recognize that gesture input controller/translator 204, audio input controller/translator 218, and computer/controller 206 may be combined without departing from the present invention. In the embodiment shown in FIG. 6, when computer/controller 206 receives a gesture or audio signal, computer/controller 206 processes the data to provide signals to three different devices. In particular, computer/controller 206 matches the gesture or audio signal to a haptic effect that is selected from a haptic table 208. For example, and not by way of limitation, if the haptic effect is generally a vibratory effect, a particular vibratory effect, in terms of degree, magnitude, frequency, and/or duration is selected. Further, if the gesture and audio based input system allows for input from multiple users, the computer/controller 206 selects to which user the haptic effect will be delivered. Further, in an embodiment, different haptic actuators 110 may be selected for an individual user. For example, and not by way of limitation, activation of a haptic actuator 110 in head rest 12 of driver seat 10 may have a different feedback meaning than activation of a haptic actuator 110 in seat base 16 of driver seat 10. In essence, the computer/controller 206 selects to which haptic actuator 110 a signal will be sent. Thus, computer/controller 206 selects a particular haptic effect from haptic table 208 and a particular haptic actuator 110 to which the effect will be applied. A signal for the selected haptic effect is then sent to the selected haptic actuator 110.

Simultaneously, computer/controller 206 sends a signal to display 50 to show the action being taken. For example, and not by way of limitation, if a user selects an icon (e.g., radio, navigation, climate, etc.), computer/controller 206 sends a signal to display 50 for the selected icon to be highlighted. Further, any sub-menus associated with the selected icon will be displayed. For example, and not by way of limitation, FIG. 5 shows an example display with a main menu 52 and a sub-menu 54. If the climate control icon is selected on main menu 52, such as by using a gesture or voice command, computer/controller 206 sends a signal to display 50 to highlight the climate icon, as shown in FIG. 5. With the climate icon selected, the sub-menu 54 associated with the climate control appears. Similarly, if any of the other icons on the main menu 52 are selected, a sub-menu associated with that main menu will appear.

Further, if the gesture or audio command by the user is used to control a particular system, computer/controller 206 also sends a signal to the vehicle system 212 to perform the selected control. For example, and not by way of limitation, upon selecting the climate icon of main menu 52, if a gesture or audio command is used to increase the driver side temperature is recognized by the camera 60/microphone 64 and processed as described above, computer/controller 206 sends a signal to the climate control system of the vehicle to increase the temperature air blown through the driver side vents, for example. In another example, if the radio icon is selected from main menu 52 and a particular gesture or audio command is given for increasing the volume, computer/controller 206 sends a signal to the radio control system 212 to increase the volume. Such signals will be sent to other vehicle control system 212, such as for a CD player, navigation system, phone, DVD player, gaming system, or other vehicle system or sub-system, or auxiliary system coupled to a vehicle system. Further, those skilled in the art will recognize that although display 50 has been identified separately from other vehicle systems, display 50 is one of the vehicle systems and need not be identified separately. It is identified separately in this description for convenience because some actions result only in action on the display, such as highlighting an icon, whereas other actions result in action either only on the other vehicle systems, or in both the other vehicle systems and the display.

Accordingly, the haptic feedback described above can be used confirm or describe actions that are being taken based on the gesture based input. In one example, summarized in Table 2 below and described with respect to a system such as the system shown in FIG. 5, a driver of a vehicle V makes gestures that are monitored by camera 60 and gives voice commands that are received by microphone 64. Although the example below is described with respect to a driver making gestures and giving voice commands, and particular haptic effects described below, those skilled in the art will recognize that similar gestures and voice commands may be made by passengers in the vehicle, that such gestures and voice commands may be detected by camera 60/microphone 64 or other cameras/microphones, and that the haptic effect may be provided to the user making the gesture/giving the voice command. Of course, those skilled in the art will also recognize that in some embodiments, only the driver of the vehicle senses haptic feedback, while the passengers may receive other types of feedback, such as audio or visual, because the passengers do not need to keep their eyes on the road. However, haptic effects may be desirable for passengers to enhance their experience when interacting with entertainment systems in the vehicle, such as gaming systems or video systems.

In the particular example of combining gesture-based input, audio-based input, and haptic effect feedback, Table 2 shows various hand gestures and voice commands to control various vehicle system, and haptic effects associated with such actions. Table 2 will be explained with respect to the exemplary display 50 show in FIG. 5. Accordingly, the driver may wave a hand or finger to activate the system, as described above with respect to Table 1. Accordingly, computer/controller 206 sends a signal to select the haptic effect of a short vibration from table 208 and sends it to a haptic actuator 110 associated with the driver, such as in driver seat 10. Upon feeling the short vibration, the driver may begin moving a finger or hand to track across main menu 52. As the driver is moving a finger/hand, a light continuous vibration alerts the drive when the drivers hand/finger is over an icon in main menu 52, as shown in Table 2 under "Basic Navigation". The driver can then select the icon by giving a voice command, such as "select" or "yes", as shown in Table 2. Computer/controller 206, upon recognizing the voice command, will send a signal to select a short vibration from the haptic effect table and send a signal for such a vibration to a haptic actuator 110 associated with the driver. Simultaneously, a signal is sent to display 50 to highlight the climate icon and to display the climate sub-menu options on sub-menu 54, as shown in FIG. 5. The haptic effect allows the driver to know that the icon has been selected. As described above, several options for haptic feedback may be used to ensure that the driver is aware that he or she has selected the desired icon, such as different haptic effects associate with each vehicle system on main menu 52.

Once the icon has been selected from main menu 52 and the sub-menu 54 for the selected system has appeared, as described above, the driver may make further gestures to control the selected system as displayed on sub-menu 54. Thus, in the example provided in FIG. 5 and Table 2, upon selection of the climate icon, the driver may move a finger to select items along the top bar of sub-menu 54 in a similar fashion as described above with respect to main menu 52, and the appropriate haptic effect is provided. For example, and not by way of limitation, as the driver moves a hand/finger over the icons along top bar of sub menu 54, the "Basic Navigation" features of Table 2 are used. Thus, if the driver's hand/finger hovers over the "Auto" icon, a light continuous vibration is felt from haptic actuator 110. Further, the driver may select the "Auto" icon by voice command of "select" or "yes", as described above. Upon recognition of the voice command, computer/controller 206 sends a signal to haptic actuator 110 for a short vibration and a signal to display 50 to highlight the "Auto" icon.

When the sub-menu is selected, the driver can then perform other activities in the sub menu. For example, the driver's fingers can be moved over the driver side temperature reading of 72 in FIG. 5. A haptic effect such as a light continuous vibration confirms to the driver that the temperature is selected. The driver can then change the value of the driver's side temperature by voice command, such as "74", as shown in the "Change value, direct input, text input" row of Table 2. Accordingly, computer/controller 206 sends a signal to haptic actuator 110 for a short vibration, a signal to display 50 to change the displayed driver's side temperature setting from "72" to "74", and a signal to the climate control system to have the vehicle HVAC system provide a 74 degree temperature to the driver's side.

Table 2 shows how the gesture and voice inputs and haptic effect feedback may be used in combination to make selection and control of various vehicle functions relatively simple without the need for the driver to look at display 50. While a particular sub-menu selection was described above, those skilled in the art would recognize that the other vehicle systems may be controlled as described in Table 2, such as by selecting the radio icon on main menu 52 and using a voice command to change the station or raise and lower the volume, with the corresponding haptic effects shown in Table 2 providing feedback that the command has been processed y computer/controller 206.

TABLE 2

| | Gesture | Haptic Effect | Voice Command | Haptic Effect |
|---|---|---|---|---|
| Change value of setting | Hand/Finger hover over icon | Light, continuous vibration | "on" "off" "34" (volume) | Short vibration |
| Change value, direct input, text input | Hand/Finger hover over icon/locaton | Light, continuous vibration | Value, i.e. "72 degrees" or "Preset 2" | Short vibration |
| Change Value | Hand/Finger hover over icon | Light, continuous vibration | "up" "increase" "down" "decrease" | Short vibration |
| Basic Navigation | Hand/Finger Hover over icon | Light, continuous vibration | "Select" or "Yes" | Short vibration |

In another embodiment described with respect to Table 3 below, interactions between the front and rear passengers are incorporated into the haptic feedback system. The embodiments shown in FIG. 4 or FIG. 6 can be used to implement the responses shown in Table 3.

TABLE 3

| FIRST ACTION | SECOND ACTION | HAPTIC EFFECT |
|---|---|---|
| Front passenger selects media/game for rear passenger | None | Light vibration |
| Front passenger interrupts media/game for rear passenger | None | Light vibration |

TABLE 3-continued

| FIRST ACTION | SECOND ACTION | HAPTIC EFFECT |
| --- | --- | --- |
| Rear passenger interrupts media/game | None | Light vibration |
| Rear passenger selects media/game | Front passenger authorizes media/game playback | Medium vibration |
| One rear passenger interacts with media/game | Other rear passenger interacts with media/game | Vibrations corresponding to media/game |
| Rear passenger media/game system has issues | None | Medium vibration |
| Rear seat belt unbuckled | None | Vibration which increases intensity with time |
| Door open/opened | None | Continuous vibration |

As described above, the gestures, commands, and specific haptic effects described with respect to Tables 1-3 are merely examples. Infinite variations of particular gestures, commands, and resulting haptic effects can be contemplated by those skilled in the art in keeping with the scope and content of the present invention.

Accordingly, while various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A system for controlling one or more of a plurality of vehicle components comprising:
    a haptic actuator configured to provide haptic feedback to a vehicle driver or passenger;
    a gesture detection device disposed in an interior of the vehicle, wherein the gesture detection device is configured to capture movements of the vehicle driver or passenger and output data representing a gesture made by the vehicle driver or passenger; and
    a controller coupled to the gesture detection device and configured to receive a signal from the gesture detection device indicative of the gesture, wherein the controller is coupled to a haptic effect feedback system and the plurality of vehicle components,
    wherein based on the signal indicative of the gesture, the controller is configured to send a signal to select a haptic effect from an effect table and configured to send a signal to the haptic actuator to provide the selected haptic effect, and
    wherein based on the signal indicative of the gesture, the controller is further configured to send a signal to at least one of the plurality of vehicle components to perform a particular action, wherein the particular action of the at least one of the plurality of vehicle components is matched with the selected haptic effect.

2. The system of claim 1, wherein the at least one of the plurality of vehicle components is a display and the signal from the controller to the display highlights an icon on the display.

3. The system of claim 2, wherein the controller is further configured to send a signal to a second one of the plurality of vehicle components to perform a second particular action, wherein the second particular action of the second one of the plurality of vehicle components is matched with the particular action of the display and the haptic effect.

4. The system of claim 1, wherein the plurality of vehicle components are selected from the group consisting of a display, radio, a CD player, a climate control system, a navigation system, a Bluetooth® wireless communication system, and an auxiliary device system.

5. The system of claim 1, wherein the haptic actuator is selected from group consisting of electromagnetic motor actuators, eccentric rotating mass, linear resonant actuators, shape memory alloy actuators, electro-active polymer actuators, vibrotactile actuators, inertial actuators, piezoelectric actuators, and moving magnet actuators.

6. The system of claim 1, wherein the haptic actuator is coupled to a portion of an interior of the vehicle.

7. The system of claim 6, wherein the haptic actuator is coupled to at least one of a seat, a steering wheel, an armrest, a door rest, or a seat belt.

8. The system of claim 1, wherein the haptic actuator is coupled to an object that is wearable by the vehicle driver or passenger.

9. The system of claim 8, wherein the object that is wearable by the vehicle driver or passenger is at least one of a glove, a hat, a wrist band, or a wristlet.

10. The system of claim 1, wherein the gesture detection device is at least one camera.

11. The system of claim 1, further comprising:
    an audio detection device disposed in an interior of the vehicle, wherein the audio detection device is configured to receive voice commands of the vehicle driver or passenger and to output data representing the voice command;
    wherein the controller is coupled to the audio detection device and is configured to receive a signal from the audio detection device indicative of the voice command,
    wherein based on the signal indicative of the voice command, the controller is configured to send a signal to select a haptic effect from the effect table and configured to send a signal to the haptic actuator to provide the selected haptic effect, and
    wherein based on the signal indicative of the voice command, the controller is further configured to send a signal to the at least one of the plurality of vehicle components to perform a particular action, wherein the particular action of the at least one of the vehicle components is matched with the selected haptic effect.

12. The system of claim 11, wherein the audio detection device comprises a microphone.

13. A method of controlling one or more of a plurality of vehicle components comprising the steps of:
    tracking movements of a driver or passenger of the vehicle to detect a gesture by the driver or passenger from a table of gestures;
    selecting a haptic effect from a table of effects based on the detected gesture;
    providing the haptic effect to the driver or passenger through a haptic actuator;
    controlling at least one of the plurality of vehicle components to perform a particular action based on the detected gesture, wherein the particular action of the at least one of a plurality of vehicle components is matched with the selected haptic effect.

14. The method of claim 13, wherein the at least one of the vehicle components is a display and the particular action is highlighting an icon on the display based on the detected gesture.

15. The method of claim 14, further comprising the step of controlling at least a second one of a plurality of vehicle components to perform a second particular action, wherein the second particular action of the second one of the plurality of vehicle components is matched with the particular action of the display and the haptic effect.

16. The method of claim 13, wherein the plurality of vehicle systems includes a plurality of vehicle components selected from the group consisting of a display, radio, a CD player, a climate control system, a navigation system, a Bluetooth® wireless communication system, and an auxiliary device system.

17. The method of claim 13, wherein the haptic actuator is selected from group consisting of electromagnetic motor actuators, eccentric rotating mass, linear resonant actuators, shape memory alloy actuators, electro-active polymer actuators, vibrotactile actuators, inertial actuators, piezoelectric actuators, and moving magnet actuators.

18. The method of claim 13, wherein the haptic actuator is coupled to an interior of the vehicle.

19. The method of claim 18, wherein the haptic actuator is coupled to at least one of a seat, a steering wheel, an armrest, a door rest, or a seat belt.

20. The method of claim 13, wherein the haptic actuator is coupled to an object that is wearable by the driver or passenger.

21. The method of claim 13, wherein the step of tracking movements of the driver or passenger is performed via a camera.

22. The method of claim 13, further comprising:
- detecting sound in the vehicle to detect a voice command from the vehicle driver or passenger;
- selecting a haptic effect from a table of effects based on the detected voice command;
- providing the haptic effect through the haptic actuator;
- controlling at least one of the plurality of vehicle components to perform a particular action based on the detected voice command, wherein the particular action of the at least one of a plurality of vehicle components is matched with the selected haptic effect.

23. The method of claim 22, wherein the step of detecting sound in the vehicle is performed via a microphone.

\* \* \* \* \*